J. P. CRANDALL.
ELECTRICALLY CONTROLLED RELEASING MEANS.
APPLICATION FILED OCT. 30, 1915.
1,239,569.  Patented Sept. 11, 1917.
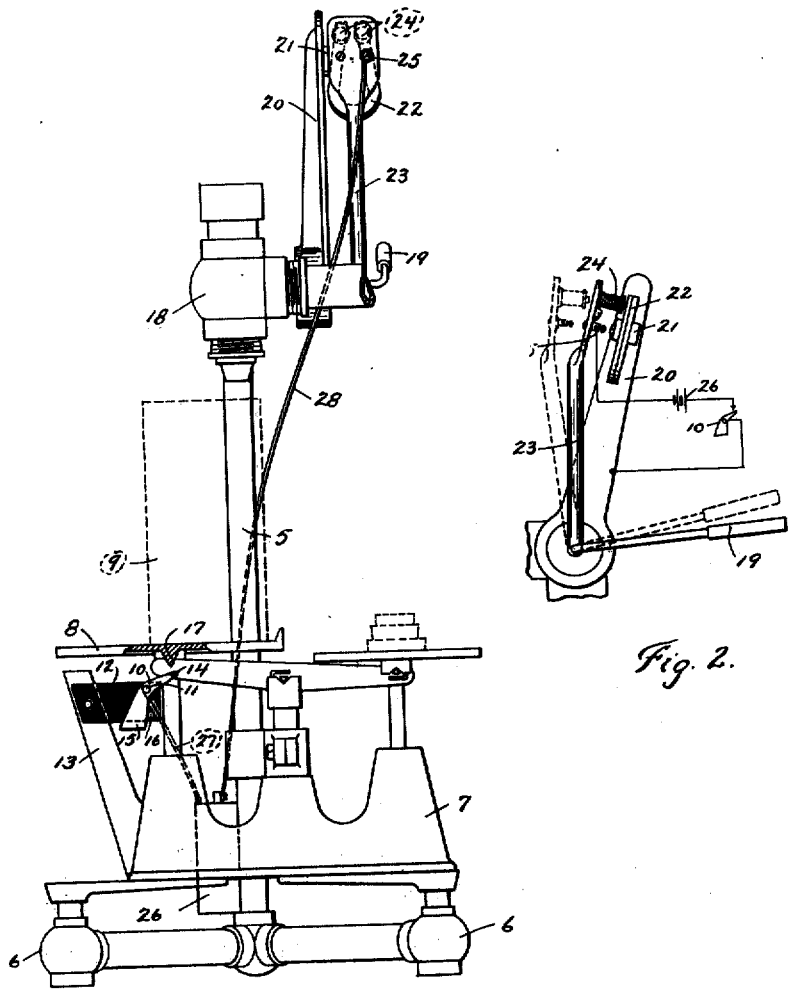
Fig. 1.
Fig. 2.
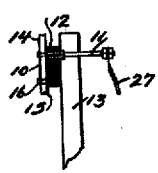
Fig. 3.
WITNESSES:
Walter H. Kelley
Clara Bowers
INVENTOR
John P. Crandall
BY
J. W. M. Ellis
ATTORNEY

UNITED STATES PATENT OFFICE.

JOHN P. CRANDALL, OF BUFFALO, NEW YORK.

ELECTRICALLY-CONTROLLED RELEASING MEANS.

1,239,569.        Specification of Letters Patent.        Patented Sept. 11, 1917.

Application filed October 30, 1915. Serial No. 58,858.

*To all whom it may concern:*

Be it known that I, JOHN P. CRANDALL, a citizen of the United States of America, and a resident of the city of Buffalo, county of Erie, and State of New York, have invented certain new and useful Improvements in Electrically-Controlled Releasing Means, of which the following is a full, clear, and exact description.

My device relates generally to releasing means, and more particularly to those means employed in filling machines, where, when a predetermined amount of material has been discharged into a receptacle, which is usually placed upon a scale, the flow of the material is stopped automatically.

In the following description and accompanying drawings, I have shown and described my means in connection with a can filling machine. This is, however, for illustration only, and it is obvious that my means may be employed in connection with any device where a predetermined amount or weight of liquids or materials are to be handled.

The general object of my invention has been to provide a means which shall be very simple in construction and operation. Moreover, I have sought to provide a releasing means which shall be very sensitive, and which shall respond quickly when in operation so that it will accurately measure the desired predetermined quantity.

I have accomplished the above objects and advantages by the device shown in the accompanying drawings, in which:

Figure 1 shows a front elevation of my device when applied to a can filling machine.

Fig. 2 is a fragmentary, side elevation of my releasing means, showing, in a diagrammatical manner, the electrical connections.

Fig. 3 is a fragmentary, side elevation of the contact making means.

In the drawings, 5 represents the standard or main support of the can filling machine, having suitable supporting feet 6. 7 is the scale of the device, which, in this case, is of the ordinary balancing type. On the pan 8 of the scale is set the receptacle 9, which is to be filled. Directly beneath this pan is arranged the contact making means of my device. These means, preferably comprise a contact arm 10, which is pivotally mounted on a contact rod 11, carried by a block of insulating material 12. This block is secured to any stationary part of the scale, and for convenience, is shown bolted to an upwardly extending arm 13 thereof. The contact arm 10 is provided with an obliquely arranged, upper end 14 and a weighted, downwardly extending end 15. A stop 16 is provided on the block 12. The weighted end 15 keeps the arm in contact with the stop 16 and normally in the position as shown in the drawings. When the scale pan 8 begins to descend, a portion thereof (in this case the rib 17) comes in contact with the upper end 14 of the contact arm, thus closing the electrical circuit hereinafter described. As the arm 10 is pivoted, after making contact with the scale pan 8, the end 14 thereof will be moved downwardly, thus allowing the scale pan to have its full motion.

Carried at the upper end of the support 5 of the machine is the liquid valve 18, which is raised through the medium of the operating arm 19. These elements do not form a part of my invention, and therefore need not be further described. 20 is the magnet arm of my machine, carried by some stationary part thereof, and having near its upper end an integral block 21. A permanent magnet 22 (preferably comprising a plurality of permanent units) is carried at the upper end of the magnet arm and is secured in any suitable way to the block 21. 23 is the release arm of my device, which is secured in any suitable way to the valve actuating means or operating arm 19. At the upper end of this arm is secured an electromagnet 24. This magnet is so arranged that the outer ends of its cores will contact with the ends of the permanent magnet 22. The terminal at one side of the winding of the electromagnet is grounded to the arm 23, and the other side of the winding is connected with the binding post 25, which is insulated from the arm 23.

In carrying out my invention, I make use of the permanent magnet to retain the soft iron cores of the electromagnet in contact therewith, and also make use of the principle by which magnetic poles of like polarity will have a mutual repulsion for each other. A battery 26, preferably of the dry cell type, is secured to the machine in any suitable position, and one terminal thereof is connected with the contact rod 11 by a wire 27, and the other side of the battery is connected with the binding post 25 by means of a wire 28.

It will be clearly seen that when the parts are in the position shown in the drawings, the electromagnet will be deënergized and the magnetism of the permanent magnet will hold the electromagnet cores in contact with itself, thus keeping the parts of the machine in the position where the discharge valve will be open. The electromagnet is so wound and the battery is so connected that, when energized, the polarity of its cores will be the same as the polarity of the permanent magnet. Thus, it will be seen that when the scale pan descends and contact is made, the battery will energize the electromagnet 24 and cause the poles of like polarity to repel each other. This will counteract the attraction of the permanent magnet and cause the electromagnet to be forced from it. Just as soon as this occurs, the arm 23 will be released and the descending valve will move it to the position shown in dotted lines, thus closing the valve and shutting off the fluid. When another receptacle has been placed upon the scale pan, the operating arm 19 will be moved again to the position shown in full lines, which again opens the valve and brings the now deënergized electromagnet in contact with the permanent magnet, where it will be held by the magnetism thereof.

It will be seen that the consumption of current in the operation of my device is very small, because the moment the receptacle is filled and the valve shut off, the filled receptacle is immediately removed from the scale pan 8, which is again quickly moved to the position shown in the drawings by the weights on the weight pan and the circuit again broken.

Moreover, while I have shown and described my invention as applied to a scale of the ordinary balancing type, it may be used with scales of any other type with equal efficiency. These and other detailed modifications of the device herein shown and described may be made without departing from the spirit of my invention or the scope of the appended claims, and I do not wish to be limited to the exact embodiment herein shown and described.

Having thus described my invention, what I claim is:

1. An electrically controlled releasing means comprising normally open contact making means, a rigidly mounted, permanent magnet, a movable electromagnet mounted opposite said permanent magnet, a suitable source of electric energy, mechanical means for closing said contact making means, a suitable electric circuit connecting said source of electric energy, said electromagnet and said contact making means, said magnets being so arranged that like poles thereof are opposite each other, and releasing means connected with and actuated by said movable magnet.

2. The combination with a scale of an electrically controlled releasing means consisting of normally open contact making means comprising a movable scale part, a pivotally mounted, counterweighted, contact arm located in the path of travel of said scale part, a rigidly mounted permanent magnet, a movable electromagnet mounted opposite said permanent magnet, a suitable source of electric energy, a suitable electric circuit connecting said source of electric energy, said electromagnet and said contact making means, said magnets being so arranged that like poles thereof are opposite each other, and releasing means connected with and actuated by said movable magnet.

3. An electrically controlled releasing means comprising normally open contact making means, a rigidly mounted magnet arm, a permanent magnet carried by said arm, a movable release arm, an electromagnet carried by said release arm, said magnets being mounted opposite each other and so arranged that like poles thereof are opposite each other, a suitable source of electric energy, and a suitable electric circuit connecting said source of electric energy, said electromagnet and said contact making means.

4. The combination with a scale of an electrically controlled releasing means, consisting of normally open contact making means comprising a movable scale part, a pivotally mounted, counterweighted, contact arm located in the path of travel of said scale part, a rigidly mounted magnet arm, a permanent magnet carried by said arm, a movable release arm, an electromagnet carried by said release arm, said magnets being mounted opposite each other and so arranged that like poles thereof are opposite each other, a suitable source of electric energy, and a suitable electric circuit connecting said source of electric energy, said electromagnet and said contact making means.

In testimony whereof, I have hereunto signed my name in the presence of two subscribing witnesses.

JOHN P. CRANDALL.

Witnesses:
J. WM. ELLIS,
WALTER H. KELLEY.